Oct. 19, 1926.

R. S. BURDETTE 1,603,312

METHOD OF AND APPARATUS FOR MANUFACTURING INNER TUBES

Filed May 28, 1925

INVENTOR
Richard S. Burdette,

BY

*R. D. Trogner*

ATTORNEY

Patented Oct. 19, 1926.

1,603,312

UNITED STATES PATENT OFFICE.

RICHARD S. BURDETTE, OF AKRON, OHIO, ASSIGNOR TO THE GOODYEAR TIRE & RUBBER COMPANY, OF AKRON, OHIO, A CORPORATION OF OHIO.

METHOD OF AND APPARATUS FOR MANUFACTURING INNER TUBES.

Application filed May 28, 1925. Serial No. 33,447.

My invention relates to a method of and apparatus for manufacturing inner tubes and it has, for its primary object, the provision of a method and apparatus which will insure efficient products in quantity production.

Another object of my invention is to provide a method of manufacturing inner tubes which will require minimum expenditure of time and labor in curing tubes, and which will facilitate proper shaping of the tubes for actual use.

Another object of my invention is to provide a method of manufacturing inner tubes by which the tubes are relatively inexpensively cured in such manner that they are free from uneven and excessive distortion stresses after they have been spliced or inflated to assume their final form.

Still another object of my invention is to provide apparatus for manufacturing inner tubes which will permit the tubes to be cured in relatively straight tubular contour in such manner that they will assume the shape of a tire casing when inflated therein without imposing excessive stresses upon the walls of the tube.

A further object of my invention is to provide an apparatus which will facilitate the curing of inner tubes in relatively straight form and at the same time to impart to the finished product substantially the same characteristics as those found in inner tubes formed upon curved mandrels.

One of the most commonly known methods of manufacturing inner tubes consists in mounting rubber stock upon a straight smooth cylindrical mandrel or core, after which strips of fabric are wound tightly about the tube stock to bring it into close contact with the mandrel in order that the tube shall be completely covered by the wrappings. After this is done, the wrapped tube and its core or mandrel are disposed in a suitable heating chamber where heat is applied to cure the rubber forming the tube.

Although the above described method, in some cases, produces tubes which are satisfactory from a practical standpoint, later development of tires, especially of the so-called balloon type of tires, imposes requirements for certain characteristics which cannot be acquired by utilization of the smooth straight mandrel. Curved tubes, that is, those which are cured on a curved core or mandrel of substantially the same contour as the casing in which they are to be used, are becoming more necessary with the advent of the balloon type of tires. These curved tubes are also desirable in the older type of tires although the need of employing this sort of tube in the older type is not as urgent as in the case of the balloon tires. However, curved or circular mandrels, when used for curing inner tubes, present problems such as increased expense for heating space, difficulty of disposing rubber stock and wrappings about the mandrel, difficulty of handling due to their unwieldly shape and weight, etc., which have been the subject of much research and experimentation with a view to producing inner tubes which will obviate these disadvantages. By manufacturing inner tubes according to the principles of my invention, the above mentioned difficulties and disadvantages will be obviated and a uniform tube having substantially the same characteristics as a tube formed and cured on a curved core is produced.

In order to accomplish these desired results, I have provided a relatively straight core or mandrel which is hollow and has a transversely corrugated or waved surface extending substantially throughout its length and has a diametrically oppositely disposed smooth surface which is merged into the corrugated surface. The corrugations converge as they approach the smooth surface, the concave portions of the corrugations being provided with openings communicating with the interior of the mandrel. I have found it more convenient to employ a mandrel substantially circular in cross-section, although one of elliptical or other cross-sectional form may be used.

Either laminated or tubed stock may be utilized in practicing my invention, but I have found that laminated stock is more suitable for best results. The rubber stock is rolled upon the mandrel in the usual manner and the ends fastened with suitable wrapping material. It is not necessary to wrap the stock with tape or like material along the entire length of the mandrel because the inherent adhesive qualities of the rubber provide for a sufficiently tight bond at the edges of the stock. Means is provided for exhausting air from the hollow of the mandrel in order to produce a partial vacuum therein for the purpose of drawing the rubber stock closely about the mandrel and into the concave portions of the corrugations. In this form, the assembly of mandrel and rubber stock are placed in a heating chamber and the rubber cured. After the curing operation is completed and the tube removed from the mandrel, the ends of the tube may be spliced in the usual manner.

It will be apparent that the most pronounced portions of the corrugations of the finished tube are adapted to rest adjacent the inner tread portions of a tire casing and that the smooth surface of the tube rests adjacent the wheel rim. Thus extension of the outer periphery of the tube is permitted without imposing excessive distortion or stresses thereon and the inner smooth peripheral surface conforms in a natural manner to the shape of the wheel rim or the inner periphery of the tire casing.

For a more thorough understanding of the apparatus used in practising the principles of my invention, reference may now be had to the accompanying drawings, forming a part of this specification of which:

Figure 1:
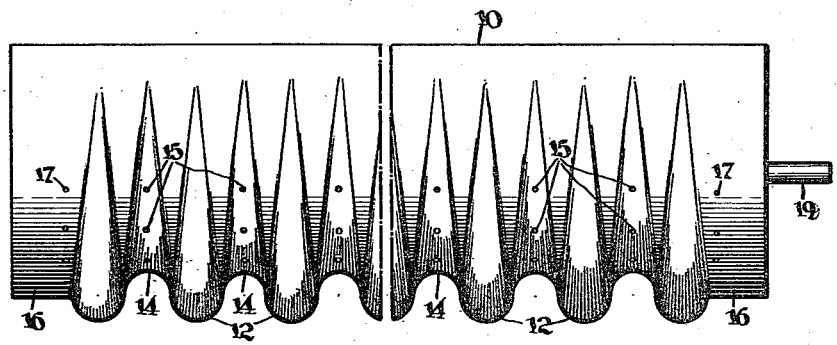
Fig. 1 is an elevational view of a mandrel constructed in accordance with the principles of my invention.
Figure 2:
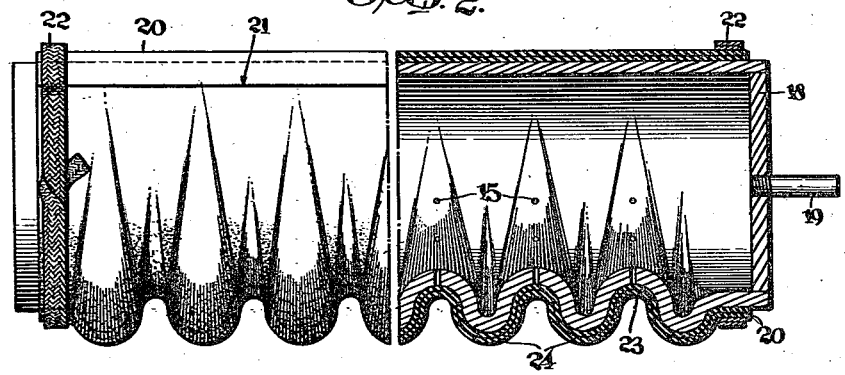
Fig. 2 is a view, partially in elevation and partially in cross-section, of a mandrel and rubber stock applied thereto, parts being broken away.
Figure 3:
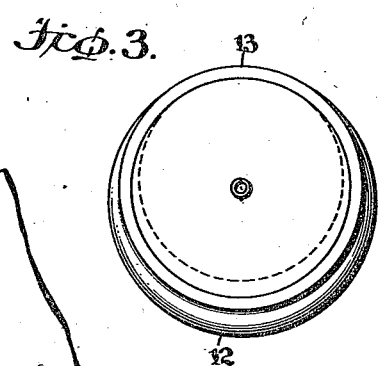
Fig. 3 is an end view of the mandrel.

In practising my invention, I have provided a substantially straight, hollow mandrel 10, circular in cross section and adapted to be sealed at each end. A series of corrugations 12 are formed transversely of the mandrel and are distributed substantially from one end thereof to the other. It will be apparent by reference to Figs. 1 and 3 that the concave and convex portions of the corrugations extend in circular relationship about the circumference of the mandrel. The most pronounced portions of the corrugations are centrally located, these portions diminishing in size toward a portion of the mandrel which is diametrically opposite the highest points of the corrugations. The corrugations, looking toward the ends of the mandrel, present a crescent-shape, as indicated in Fig. 3. Thus I have provided a relatively smooth straight cylindrical portion 13 and a diametrically oppositely disposed corrugated portion 12 on the mandrel. Each of the corrugations is formed with a concave portion 14 which is provided with a series of openings 15 communicating with the interior of the mandrel. At each end of the mandrel a short cylindrical portion 16 is formed which is also provided with openings 17 similar to ones disposed in the concave portions of the corrugations. In order to provide a partial vacuum in the mandrel, the ends thereof are sealed, as indicated at 18, and a valve connection 19 is provided in one end which is adapted to be connected to any suitable pump for producing a vacuum.

A sheet of laminated stock or tube stock 20 is disposed over the mandrel and wrapped snugly thereabout. In case laminated stock is used, which in this particular embodiment of my invention is preferable, the edges thereof, overlappping substantially along the line 21, are pressed or stitched tightly together and the stock does not require wrapping-tape. Adjacent each end of the mandrel, a piece of tape 22 is wrapped about the end of the rubber stock in order to effect an air tight closure with the end portion 16 of the mandrel. After this is done, the air is exhausted from the interior of the mandrel through the valve connection 19. Because of the suction thus afforded through the openings 15 and 17 in the concave portions 14 of the corrugations and the cylindrical portions 16, respectively, the rubber stock is drawn snugly around the mandrel against these concave portions and conforms exactly to the shape of the mandrel forming concave and convex portions 23 and 24.

Figure 4:
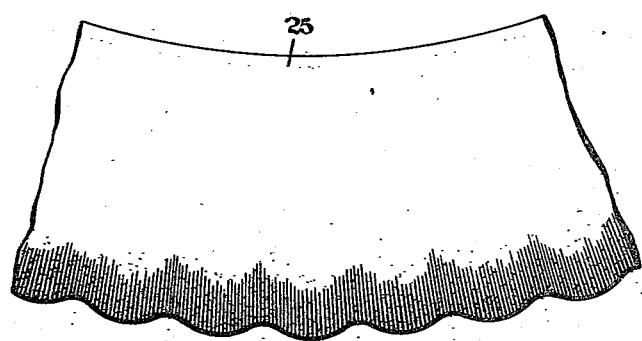
Fig. 4 is a fragmentary view of a tube manufactured according to the principles of my invention.

In this form the mandrel, with the rubber applied thereon as above described and the partial vacuum existing therein, is placed in the usual heating chamber and vulcanized. After vulcanization the valve connection 19 is opened in order to dissipate the partial vacuum, the tube is removed from the mandrel and the ends thereof are spliced in the usual manner to form an annulus, a section of which is indicated at 25 of Fig. 4. The deepest portions 23 and 24 of the corrugations correspond to the tread portion of a tire and the diametrically opposite smooth surface or inner periphery of the annulus cured on the surface 13 conforms to the portion of the tube which is disposed adjacent the rim of an automobile wheel.

If desired the ends of the mandrel may be sealed without exhausting the air therefrom and the pressure of the steam against the outer surface of the wrapped tubing may be depended upon to cause the tubing to be pressed into intimate contact with the mandrel. It will be observed that there will accordingly be a greater pressure against the wrapped tubing immediately following the insertion of the mandrel within a heater and application of steam thereto. This is true for the reason that after the steam is applied, the air confined within the mandrel becomes heated and tends to expand, exerting pressure against the interior walls of the mandrel. Although the external steam pressure is the greater, there will be a tendency for the internal air pressure and external steam pressure on the walls of the mandrel to become balanced. Thus excessive flow of rubber through the openings 15 will be prevented during the process of vulcanization when the rubber is relatively soft.

The sealed ends of the mandrel will prevent any steam from entering the hollow portion thereof. Any entrapped air between the tube and the mandrel will escape to the interior of the mandrel through the openings 15 and thereby prevent formation of air bubbles.

In case it is found that the air pressure within the mandrel should be too great when heat is applied thereto, it may be necessary to place a small amount of water within the mandrel. This will prevent the air from heating too rapidly and will maintain the desired ratio between the pressure and temperature within and without the mandrel as the steam warms the rubber of the tubing to the point where it would tend to flow excessively through the holes 15.

From the above description it will be seen that I have provided a method of manufacturing an inner tube which, when formed into an annulus, has substantially the same characteristics as if it were molded or cured upon a curved mandrel. At the same time all the advantages flowing from the method of curing inner tubes on straight mandrels are retained.

Although I have illustrated but one form which my invention may assume and have described in detail but a single application thereof, it will be apparent to those skilled in the art that it is not so limited but that various minor modifications and changes may be made therein without departing from the spirit of my invention or from the scope of the appended claims.

What I claim is:

1. A method of manufacturing inner tubes which comprises forming rubber into substantially tubular contour, shaping the rubber to provide a substantially smooth cylindrical segment, further shaping the rubber to provide raised portions opposite the cylindrical segment extending toward the latter and subsequently vulcanizing the rubber as shaped.

2. A method of manufacturing inner tubes which comprises forming laminated rubber stock into substantially tubular contour, shaping the rubber stock to provide a substantially smooth cylindrical segment, further shaping the rubber stock to provide corrugations opposite the cylindrical segment extending toward the latter, subsequently vulcanizing the rubber as shaped, and then splicing the ends of the tube to form an annulus.

3. A method of manufacturing inner tubes which comprises rolling rubber stock upon a substantially straight mandrel having a smooth surface and oppositely disposed corrugations extending toward the smooth surface, and vulcanizing the rubber stock on the mandrel.

4. A method of manufacturing an inner tube having a portion of its surface corrugated, which comprises rolling rubber stock upon a substantially straight mandrel having a transverse corrugated surface and an oppositely disposed smooth surface, and vulcanizing the rubber stock on the mandrel.

5. A method of manufacturing an inner tube having a portion of its surface transversely corrugated, which comprises rolling rubber stock upon a hollow mandrel, establishing a partial vacuum in the mandrel and vulcanizing the rubber stock upon the mandrel.

6. A method of manufacturing an inner tube which comprises rolling rubber stock upon a substantially straight mandrel circular in cross-section, having a transversely corrugated surface and an oppositely disposed smooth surface, and curing the rubber stock on the mandrel.

7. A method of manufacturing an inner tube which comprises rolling rubber stock upon a partially corrugated hollow mandrel, creating a partial vacuum in the mandrel to draw the rubber stock into the corrugations and vulcanizing the rubber stock upon the mandrel while the partial vacuum is maintained.

8. A method of manufacturing an inner tube which comprises rolling rubber stock upon a straight perforated mandrel of circular cross-section having a transversely corrugated surface and an oppositely disposed smooth surface, creating a partial vacuum in the mandrel to draw the rubber stock into close contact with the mandrel, and curing the rubber stock upon the mandrel.

9. A method of manufacturing an inner tube which comprises rolling rubber stock upon a straight perforated mandrel of circular cross-section having a transversely corrugated surface and an oppositely disposed smooth surface, binding the ends of the rubber stock to the mandrel, creating a vacuum in the mandrel to draw the rubber stock into contact with the mandrel, and curing the rubber stock upon the mandrel.

10. A mandrel for curing rubber tubing comprising a straight smooth surface and oppositely disposed raised surface portions extending toward the smooth surface.

11 A mandrel for curing rubber tubing comprising a straight smooth surface and an oppositely disposed surface formed with transverse corrugations diminishing in width as they merge into the smooth surface.

12. A hollow mandrel for curing rubber articles comprising a straight smooth surface and an oppositely disposed corrugated surface, the concave portions of the corrugations being formed with openings.

13. A substantially straight hollow mandrel for curing rubber tubing comprising a smooth surface, an oppositely disposed corrugated surface, the corrugations running transversely of the mandrel each converging toward the smooth surface, and means for creating a partial vacuum in the mandrel after the rubber tubing is disposed thereon.

14. A substantially straight hollow mandrel for curing rubber tubing adapted to be wrapped thereabout comprising a smooth surface, an oppositely disposed corrugated surface having openings formed in the concave portions of the corrugations and means for creating a partial vacuum in the mandrel for drawing the rubber tubing snugly into contact with the mandrel along the corrugations.

In witness whereof, I have hereunto signed my name.

RICHARD S. BURDETTE.